(No Model.)

C. GRAF.
CHURN.

No. 412,250. Patented Oct. 8, 1889.

WITNESSES:
Wm Wagner
A Jonghmans

INVENTOR:
Carl Graf
By Roeder & Briesen
his Attorneys.

UNITED STATES PATENT OFFICE.

CARL GRAF, OF BROOKLYN, NEW YORK.

CHURN.

SPECIFICATION forming part of Letters Patent No. 412,250, dated October 8, 1889.

Application filed June 17, 1889. Serial No. 314,629. (No model.)

*To all whom it may concern:*

Be it known that I, CARL GRAF, of Brooklyn, New York, have invented an Improved Churn, of which the following is a specification.

This invention relates to a churn, the dasher-wings of which are revolved in opposite directions, so that the milk or other liquid operated upon is thorougly agitated.

The invention consists in the various features of improvement more fully pointed out in the claims.

Figures 1, 2:
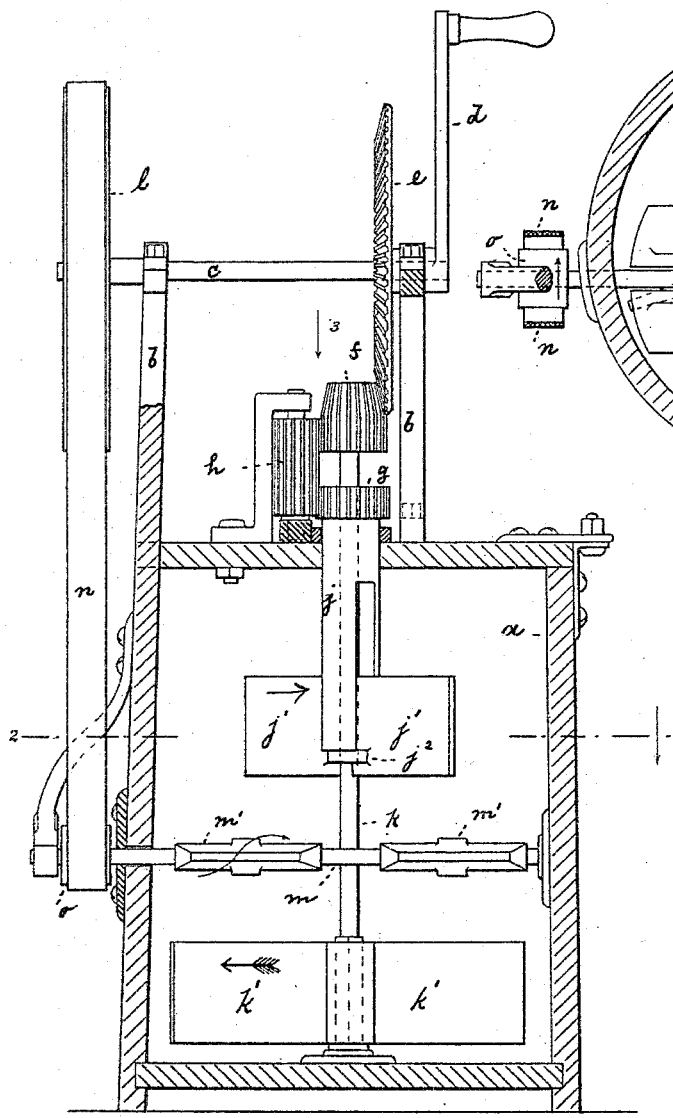
Figure 3:
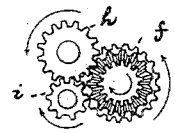

In the accompanying drawings, Figure 1 is a sectional elevation of my improved churn. Fig. 2 is a cross-section on line 2 2, Fig. 1; and Fig. 3, a top view of the gearing.

The letter $a$ represents a suitable vessel having bearings $b$, in which is hung a shaft $c$, revolved by crank $d$. Upon shaft $c$ is mounted crown-wheel $e$, engaging a pinion $f$. The pinion $f$ engages a gear-wheel $h$, which in turn meshes into the idler $i$, Fig. 3. The idler $i$ engages a pinion $g$, so that in this way the pinion $g$ is revolved in opposite direction from pinion $f$. To the gear-wheel $g$ there is connected a split tube $j$, reaching some distance down into the vessel $a$. To this tube there is attached the dasher-wing $j'$, which passes through the split tube, and which is secured in place by a suitable key $j^2$. Through the tube $j$ and through a perforation of wing $j'$ there passes the dasher-shaft $k$, revolved by crown-wheel $f$, and having its lower bearing in the bottom of vessel $a$. To the lower part of shaft $k$ there is secured the wing $k'$. The wings $j'$ $k'$ will be revolved around vertical axes, but in opposite directions, as indicated by the arrows.

The shaft $c$ carries a pulley $l$, which imparts motion to a horizontal shaft $m$, hung across vessel $a$ between wings $j'$ $k'$. The transmission of motion is effected, preferably, by band $n$ and pulley $o$, the latter fast on shaft $m$. The shaft $m$ is hung a little sidewise of shaft $k$, Fig. 2, so as to clear the latter. To the shaft $m$ are secured, at opposite sides of shaft $k$, the wings $m'$. These wings will thus be made to revolve around a horizontal shaft, or at right angles to both the wings $j'$ and $k'$.

It will be seen that in my improved churn the milk or other liquid acted upon is subjected to the action of three different wings $j'$, $k'$, and $m'$, all revolved in different directions. Thus a thorough agitation of the liquid takes place.

What I claim is—

1. The combination of the vessel $a$, with an upright dasher-shaft, a surrounding tube, and a horizontal dasher-shaft, and with wings secured to the tube and the shafts, means for revolving the upright dasher-shaft and the tube in opposite directions, and means for revolving the horizontal dasher-shaft, all substantially as specified.

2. The combination of the vessel $a$, with tube $j$, projecting partly into said vessel and carrying wings $j'$, and with shaft $k$, passing through said tube and carrying wings $k'$, and with a power-shaft and a train of gearing for revolving the tube $j$ and shaft $k$ in opposite directions, and with transverse shaft $m$, carrying wings $m'$, and revolved from the power-shaft at right angles to shaft $k$, substantially as specified.

CARL GRAF.

Witnesses:
F. V. BRIESEN,
A. JONGHMANS.